US012580293B2

(12) United States Patent
Yang et al.

(10) Patent No.: US 12,580,293 B2
(45) Date of Patent: Mar. 17, 2026

(54) RESONATOR AND METHOD OF MANUFACTURING THE RESONATOR

(71) Applicant: Suzhou Luxshare Technology Co., Ltd., Suzhou (CN)

(72) Inventors: Chongli Yang, Suzhou (CN); Xiaogang Li, Suzhou (CN); Guiping Gao, Suzhou (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 214 days.

(21) Appl. No.: 18/393,176

(22) Filed: Dec. 21, 2023

(65) Prior Publication Data

US 2024/0380090 A1 Nov. 14, 2024

(30) Foreign Application Priority Data

May 12, 2023 (CN) ......................... 202310533989.1

(51) Int. Cl.
*H01P 7/06* (2006.01)
*H01P 1/207* (2006.01)
*H01P 7/04* (2006.01)
*H01P 11/00* (2006.01)

(52) U.S. Cl.
CPC ................ *H01P 7/06* (2013.01); *H01P 1/207* (2013.01); *H01P 7/04* (2013.01); *H01P 11/008* (2013.01)

(58) Field of Classification Search
CPC ...... H01P 7/06; H01P 7/04; H01P 7/00; H01P 1/202; H01P 1/205; H01P 1/2053; H01P 1/208; H01P 11/008
See application file for complete search history.

(56) References Cited

U.S. PATENT DOCUMENTS

2010/0059692 A1 3/2010 Quick, II

FOREIGN PATENT DOCUMENTS

| | | | | | |
|---|---|---|---|---|---|
| CN | 102709628 | A | | 10/2012 | |
| CN | 202712393 | U | | 1/2013 | |
| CN | 202797236 | U | | 3/2013 | |
| CN | 203466274 | U | | 3/2014 | |
| CN | 204992023 | U | | 1/2016 | |
| CN | 207732068 | U | | 8/2018 | |
| CN | 108598636 | A | * | 9/2018 | ............. H01P 1/207 |
| CN | 209658379 | U | | 11/2019 | |
| CN | 111146555 | A | | 5/2020 | |

(Continued)

*Primary Examiner* — Stephen E. Jones

(74) *Attorney, Agent, or Firm* — Birch, Stewart, Kolasch & Birch, LLP

(57) ABSTRACT

A resonator includes a body shaft portion, a resonant disk portion and a coupling face portion. The body shaft portion has a top end and a bottom end. An inner cavity is slotted between the top end and the bottom end. The resonant disk portion is integrally formed on the top end. The coupling face portion is integrally formed on the bottom end. The body shaft portion includes a first outer surface and the coupling face portion includes a second outer surface. A first connecting arc surface is formed between the first outer surface and the second outer surface. The inner cavity has a central axis. In a transverse section perpendicular to the central axis, a wall thickness T of the body shaft portion is 0.5 mm~1 mm and a first arc length R1 of the first connecting arc surface is no more than 0.25 mm.

17 Claims, 9 Drawing Sheets

(56) References Cited

FOREIGN PATENT DOCUMENTS

| | | | |
|---|---|---|---|
| CN | 113422588 | A | 9/2021 |
| CN | 215266610 | U | 12/2021 |
| CN | 216671868 | U | 6/2022 |
| CN | 217427054 | U | 9/2022 |
| CN | 115275556 | A | 11/2022 |

* cited by examiner

RESONATOR AND METHOD OF MANUFACTURING THE RESONATOR

CROSS-REFERENCE TO RELATED APPLICATION

This patent application claims priority of a Chinese Patent Application No. 202310533989.1, filed on May 12, 2023 and titled "RESONATOR AND METHOD OF MANUFACTURING THE RESONATOR", the entire content of which is incorporated herein by reference.

TECHNICAL FIELD

The present disclosure relates to a field of communications, in particular to a resonator and a method of manufacturing the resonator.

BACKGROUND

The resonator is an important part of the filter product. The disc diameter and fillet of the resonator are directly related to the performance indicators of the filter product. The processing technology of metal resonators is generally divided into two types: cold heading and deep drawing. In conventional deep drawing processes, the fillet design is generally not less than the plate thickness. However, for filter products, the fillet dimension of key parts is closely related to product performance indicators. Existing resonator products require long production times, high costs, and relatively poor product specifications.

SUMMARY

An object of the present disclosure is to provide a resonator and a manufacturing method of the resonator, aiming to improve product design accuracy while reducing product cost.

In order to achieve the above object, the present disclosure discloses a resonator includes a body shaft portion, a resonant disk portion, and a coupling face portion. The body shaft portion has a top end and a bottom end oppositely arranged in a vertical direction. An inner cavity is slotted between the top end and the bottom end. The resonant disk portion is integrally formed on the top end of the body shaft portion and the coupling face portion is integrally formed on the bottom end of the body shaft portion. The body shaft portion includes a first outer surface being away from the inner cavity in a first direction and the coupling face portion includes a second outer surface being away from the inner cavity in a second direction perpendicular to the first direction. A first connecting arc surface is formed between the first outer surface and the second outer surface. The inner cavity has a central axis extending in the vertical direction. In a transverse section perpendicular to the central axis, a wall thickness T of the body shaft portion is 0.5 mm~1 mm and a first arc length R1 of the first connecting arc surface is no more than 0.25 mm.

In order to achieve the above object, the present disclosure further discloses a resonator which includes a body shaft portion, a resonant disk portion, and a coupling face portion. The body shaft portion defines an inner cavity extending in a vertical direction. The body shaft portion has both a top end and a bottom end, two of which oppositely arranged at the inner cavity. The resonant disk portion is integrally formed on the top end of the body shaft portion. The coupling face portion is integrally formed on the bottom end of the body shaft portion. The body shaft portion includes a first outer surface being away from the inner cavity in a first direction and the coupling face portion includes a second outer surface being away from the inner cavity in a second direction perpendicular to the first direction. A first connecting arc surface is formed between the first outer surface and the second outer surface. The inner cavity defines a central axis and a transverse section which is perpendicular to the central axis. In the transverse section, a wall thickness T of the body shaft portion is 0.5 mm~1 mm and a first arc length R1 of the first connecting arc surface is no more than 0.25 mm.

In order to achieve the above object, the present disclosure further discloses a method of manufacturing the resonator, which includes the following steps: performing a first stamping to a flat metal plate in a downward direction as forming a "prototype of the resonator", the "prototype of the resonator" having a first inner cavity, a cross section of the first inner cavity having a first width W1 and a first height H1 along its central axis; performing a second stamping to the "prototype of the resonator" in the downward direction as forming a "first deformation of the resonator", the "first deformation of the resonator" having a second inner cavity, a cross section of the second inner cavity having a second width W2 and a second height H2 along its central axis, wherein $W1>W2$ and $H1<H2$; performing a third stamping to the "first deformation of the resonator" in an upward direction, which is opposite to the downward direction, as forming a "second deformation of the resonator", the "second deformation of the resonator" causing the resonator to form a mounting face portion in the second inner cavity, the mounting face portion having a third height H3, wherein $H3<H2$; and performing a fourth stamping to the "second deformation of the resonator" in the upward direction as forming a "final form of the resonator", the "final form of the resonator" refers to that, a small rounded corner with a first arc length R1 is formed on the resonator and a mounting hole is formed on the mounting face portion.

Compared with the prior art, the resonator of the present disclosure is designed to have a first arc length R1 of the first connecting arc surface to be no more than 0.25 mm through a deep drawing process on the basis that the wall thickness T of the body shaft portion is 0.5 mm~1 mm. Therefore, the coupling area of the resonator remains unchanged in the corresponding filter cavity, the overall elasticity of the part becomes larger, and the coupling effect will be better in terms of product indicators. The manufacturing method of the resonator of the present disclosure is relatively simple and can be completed continuously through a set of deep drawing molds without additional processes. The present disclosure improves accuracy and reduces cost.

DETAILED DESCRIPTION

Figure 1:
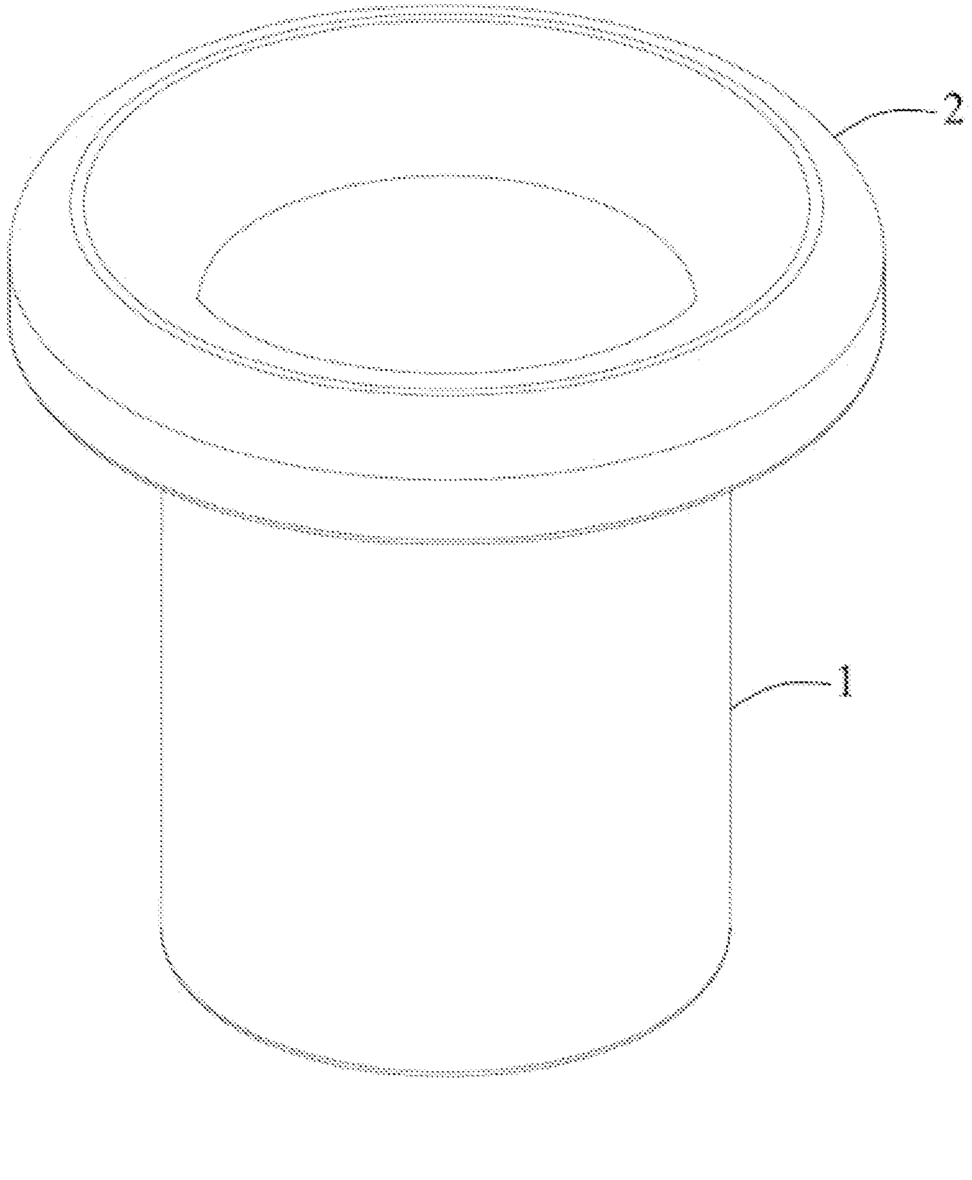
FIG. 1 is a perspective view of a resonator in accordance with an embodiment of the present disclosure.
Figure 2:
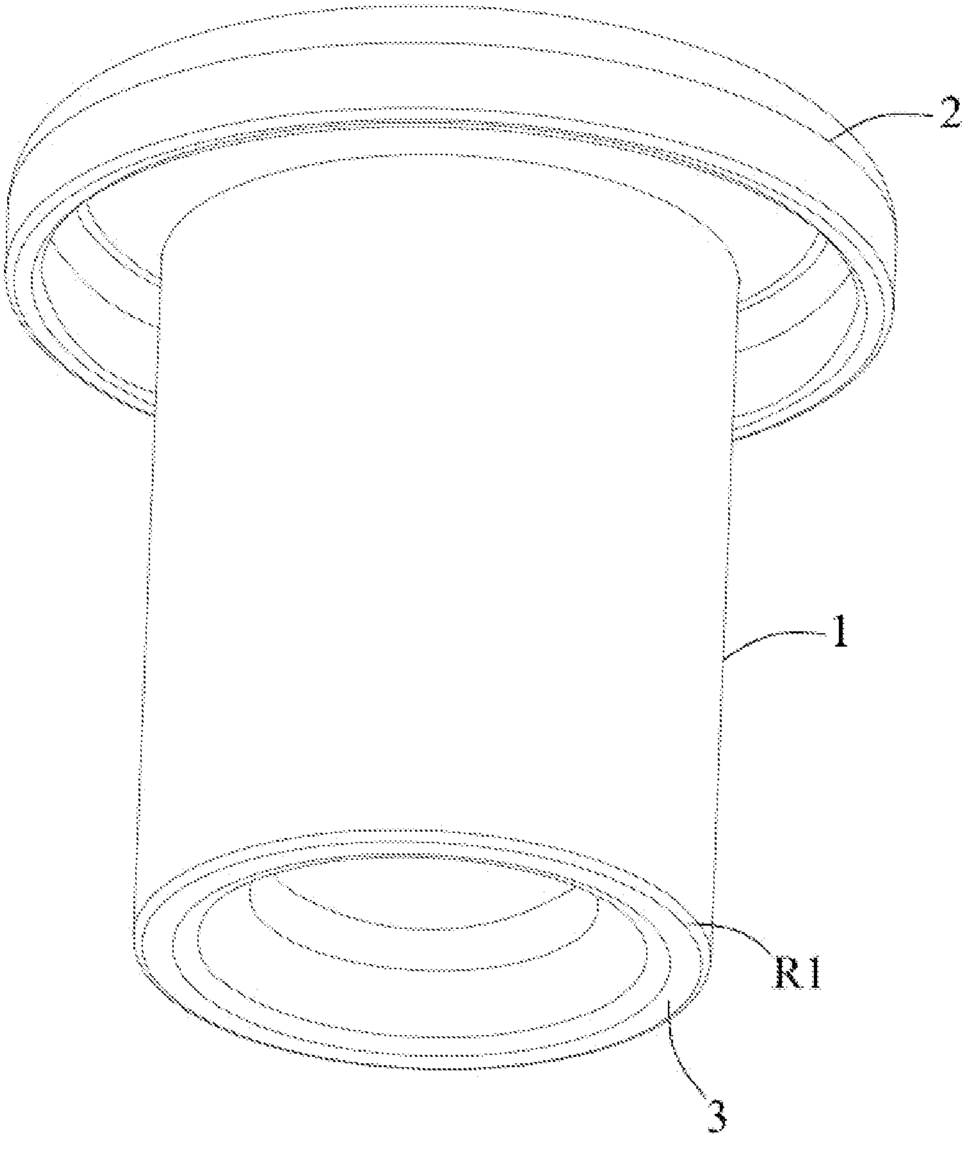
FIG. 2 is a perspective view of the resonator of the present disclosure from another angle.
Figure 3:
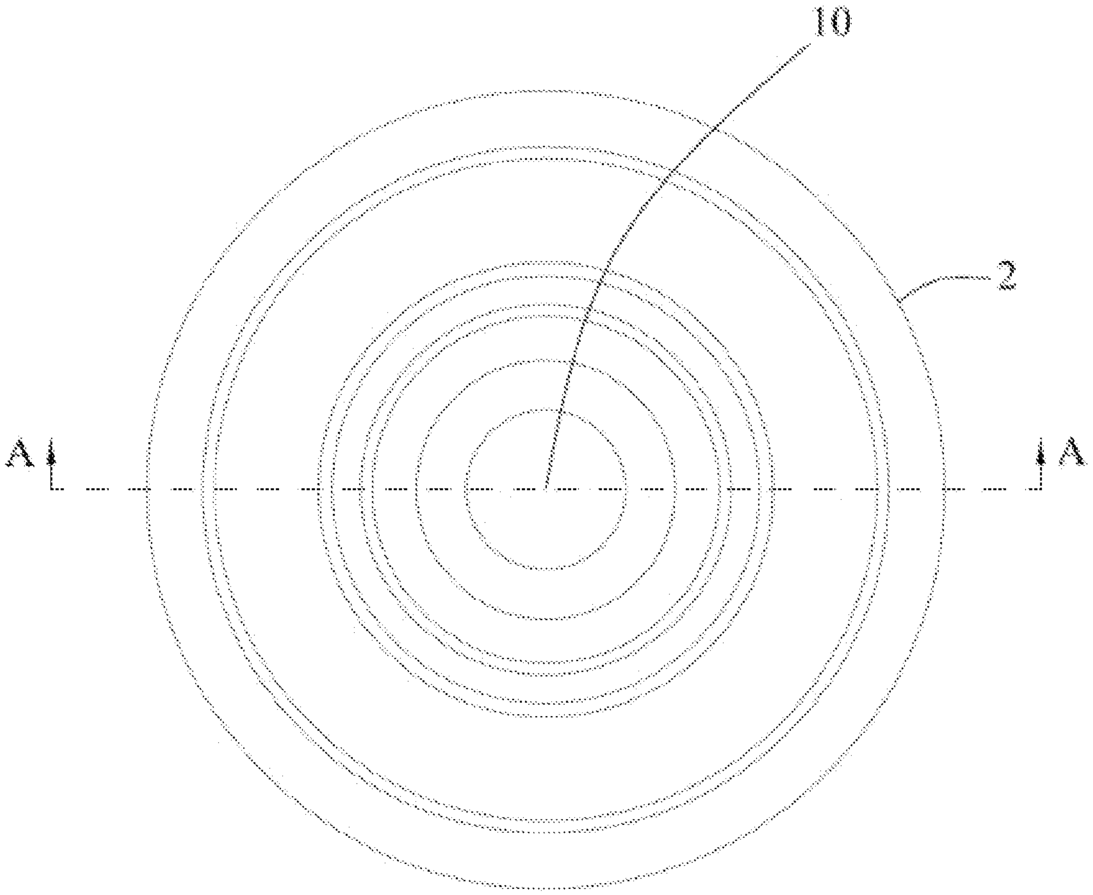
FIG. 3 is a top view of the resonator of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with the present disclosure. Rather, they are merely examples of devices and methods consistent with some aspects of the present disclosure as detailed in the appended claims.

The terminology used in the present disclosure is only for the purpose of describing particular embodiments, and is not intended to limit the present disclosure. The singular forms "a", "said", and "the" used in the present disclosure and the appended claims are also intended to include plural forms unless the context clearly indicates other meanings.

It should be understood that the terms "first", "second" and similar words used in the specification and claims of the present disclosure do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 8, the present disclosure relates to a resonator, which includes a body shaft portion 1, a resonant disk portion 2, a coupling face portion 3, a mounting face portion 4 and a connecting portion 5. The mounting face portion 4 is used to relatively fix the metal sheet (not shown) in the filter (not shown) to the resonator through insulating fasteners (not shown), so that the metal sheet and the disk surface of the resonant disk portion 2 are in parallel. The connecting portion 5 is connected between the coupling face portion 3 and the mounting face portion 4.

Referring to FIG. 1 to FIG. 4, the body shaft portion 1 has a top end and a bottom end oppositely arranged in the vertical direction of its extension. The body shaft portion 1 has an inner cavity 10 slotted between the top end and the bottom end. The resonant disk portion 2 is integrally formed on the top end of the body shaft portion 1 and is used for receiving external signals. The coupling face portion 3 is integrally formed on the bottom end of the body shaft portion 1 and is used for coupling with the metal sheet.

Referring to FIG. 1 to FIG. 6, the body shaft portion 1 includes a first outer surface 101 and the coupling face portion 3 includes a second outer surface 301. The first outer surface 101 is away from the inner cavity 10 in a first direction and the second outer surface 301 is away from the inner cavity 10 in a second direction perpendicular to the first direction. It can be understood that the first direction is the X direction extending horizontally in FIG. 4, also commonly called the transverse direction; the second direction is the Y direction extending vertically in FIG. 4, also commonly called the vertical direction.

There is a first connecting arc surface between the first outer surface 101 and the second outer surface 301. The inner cavity 10 has a central axis 100 extending in the vertical direction. The central axis 100 has a transverse section which extends perpendicular to the vertical direction. In the transverse section of the central axis 100, the wall thickness T of the body shaft portion 1 is 0.5 mm~1 mm, and a first arc length R1 of the first connecting arc surface is no more than 0.25 mm. The resonator of the present disclosure is based on the wall thickness T of the body shaft portion 1 being 0.5 mm~1 mm, and the first arc length R1 of the first connecting arc surface is designed to be no more than 0.25 mm through the deep drawing process of the present disclosure. Therefore, the coupling area of the resonator remains unchanged in the corresponding filter cavity, the overall elasticity of the resonator becomes larger, and there will be a better coupling effect in terms of product indicators. That is, based on the conventional design, through further improved small rounded design of the coupling face portion 3, the disclosed resonator achieves the beneficial effects of smaller R1 value and larger Q value (Q factor, quality factor). The manufacturing method of the resonator disclosed in the present disclosure is relatively simple and is completed continuously through a set of deep-drawing molds without additional processes.

Figure 4:
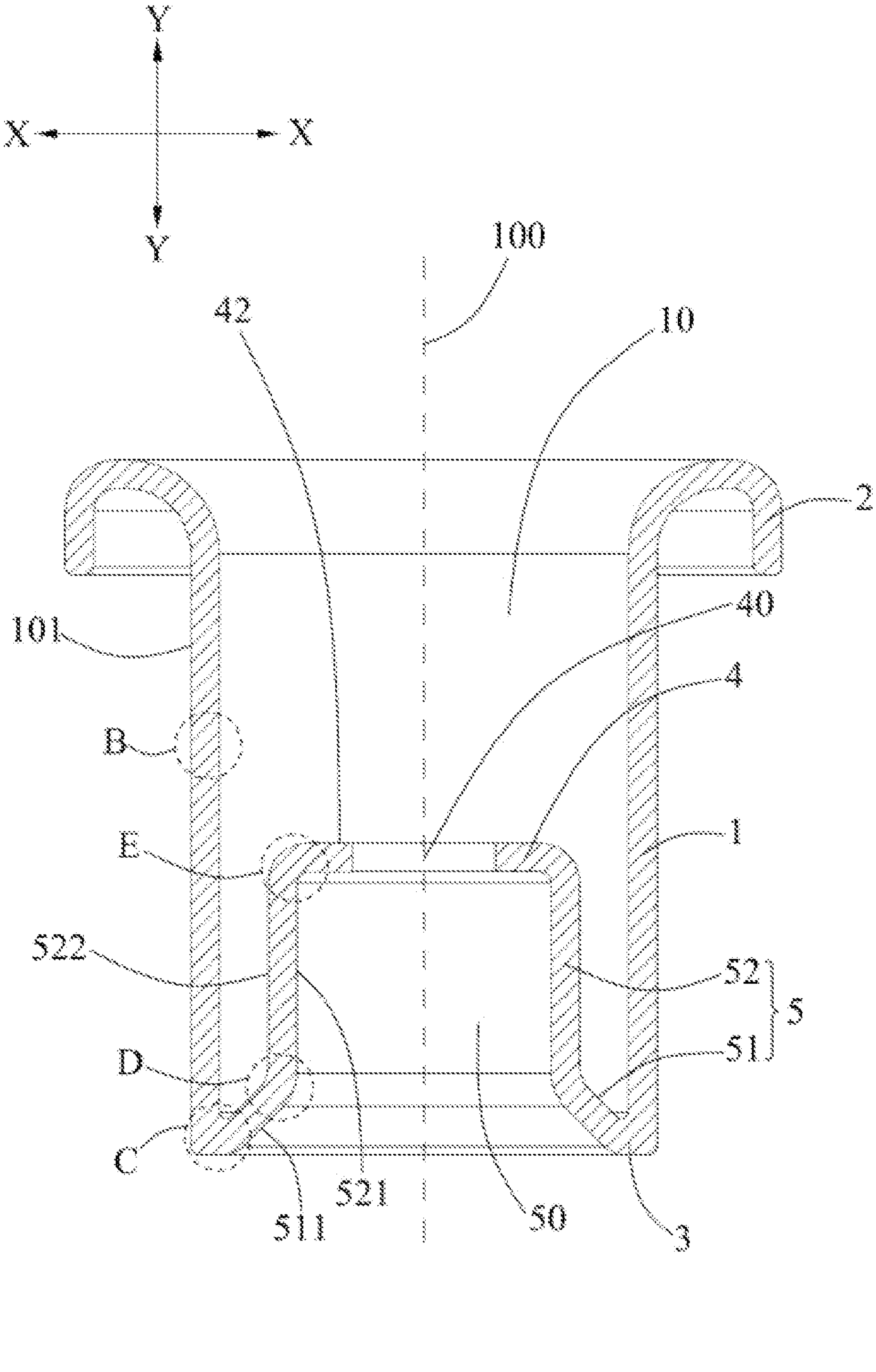
FIG. 4 is a cross-sectional view taken along line A-A in FIG. 3.
Figure 5:
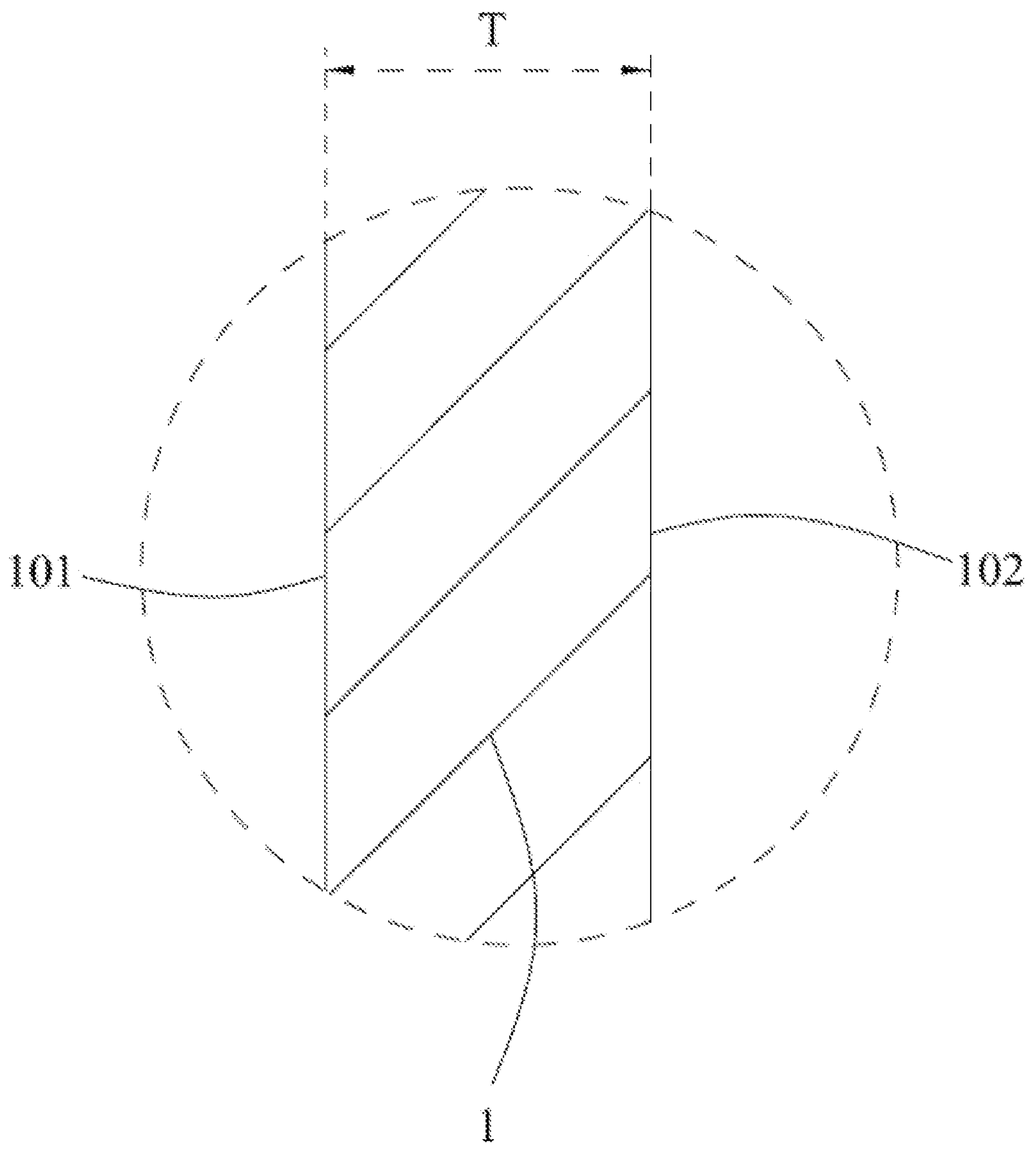
FIG. 5 is an enlarged view of part B in FIG. 4.

Referring to FIG. 4, the resonator also includes a mounting face portion 4 received in the inner cavity 10. The mounting face portion 4 and the coupling face portion 3 extend in two planes arranged up and down, and the two planes are perpendicular to the central axis 100 and parallel to each other. Furthermore, the mounting face portion 4 defines a mounting hole 40, and the center of the mounting hole 40 is located on the central axis 100 to ensure the installation accuracy of the resonator in the filter product.

Referring to FIG. 4, the resonator also includes a connecting portion 5 between the coupling face portion 3 and the mounting face portion 4. In some embodiments, the connecting portion 5 at least includes an inclined connecting portion 51 connected to the coupling face portion 3; in this present embodiment, in addition to the inclined connecting portion 51, the connecting portion 5 also includes a vertical connecting portion 52 connected to the mounting face portion 4. The reason why the inclined connecting portion 51 is called "inclined" means that there is an included angle of 0 to 90 degrees between the extension surface of the inclined connecting portion 51 and the horizontal plane where the mounting face portion 4 is located. The reason why the vertical connecting portion 52 is called "vertical" means that there is an included angle of 90 degrees between the extending surface of the vertical connecting portion 52 and the horizontal surface where the mounting face portion 4 is located. Therefore, in the present embodiment shown in FIG. 4, a substantially trumpet-shaped outer cavity 50 is formed between the mounting face portion 4, the inclined connecting portion 51, and the vertical connecting portion 52. The inner cavity 10 and the outer cavity 50 are separated by the mounting face portion 4, the inclined connecting portion 51, the vertical connecting portion 52 and are connected through the mounting hole 40.

Figure 6:
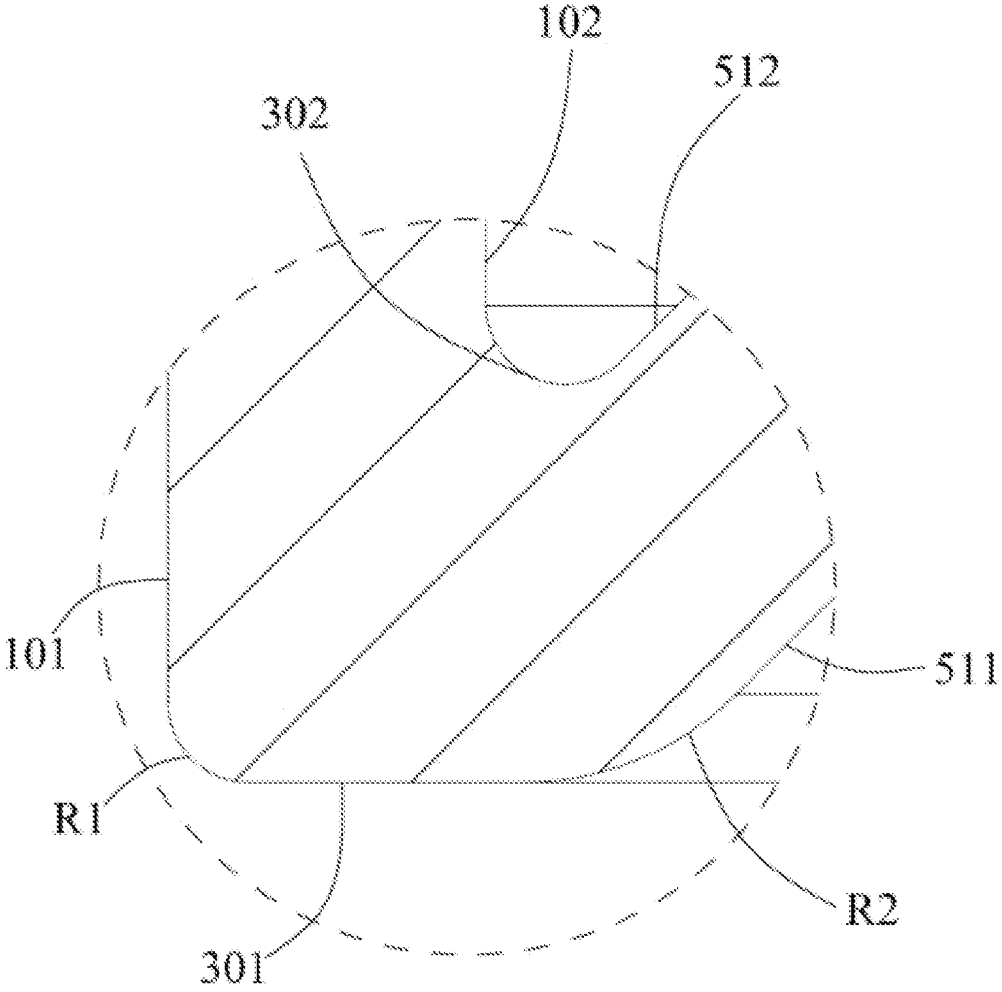
FIG. 6 is an enlarged view of part C in FIG. 4.

Referring to FIG. 4 and FIG. 6, the inclined connecting portion 51 includes a third outer surface 511 facing the outer cavity 50. There is a second connecting arc surface between the second outer surface 301 and the third outer surface 511. In the transverse section along the central axis 100, a second arc length R2 of the second connecting arc surface is 0.7 mm~0.9 mm.

Figure 7:
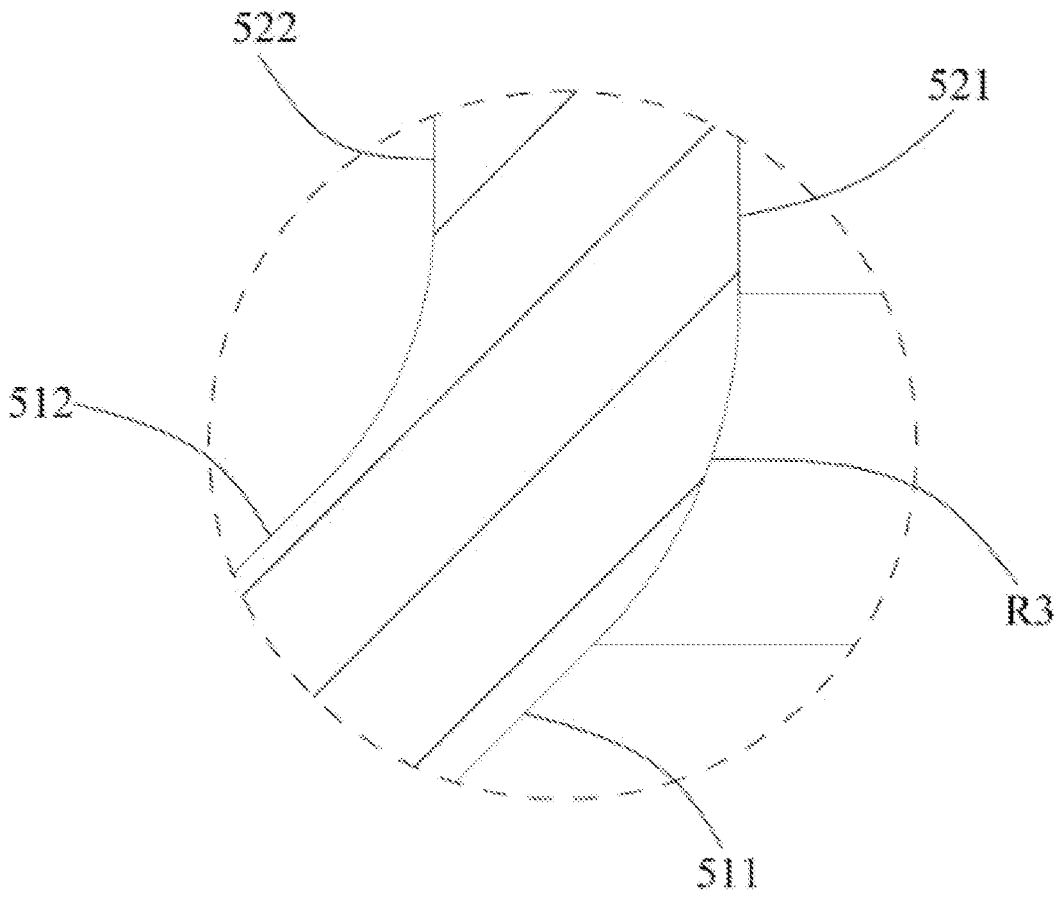
FIG. 7 is an enlarged view of part D in FIG. 4.

Referring to FIG. 4 and FIG. 7, the vertical connecting portion 52 includes a fourth outer surface 521 facing the outer cavity 50. There is a third connecting arc surface between the third outer surface 511 and the fourth outer surface 521. In the transverse section along the central axis 100, a third arc length R3 of the third connecting arc surface is 0.7 mm~0.9 mm.

Figure 8:
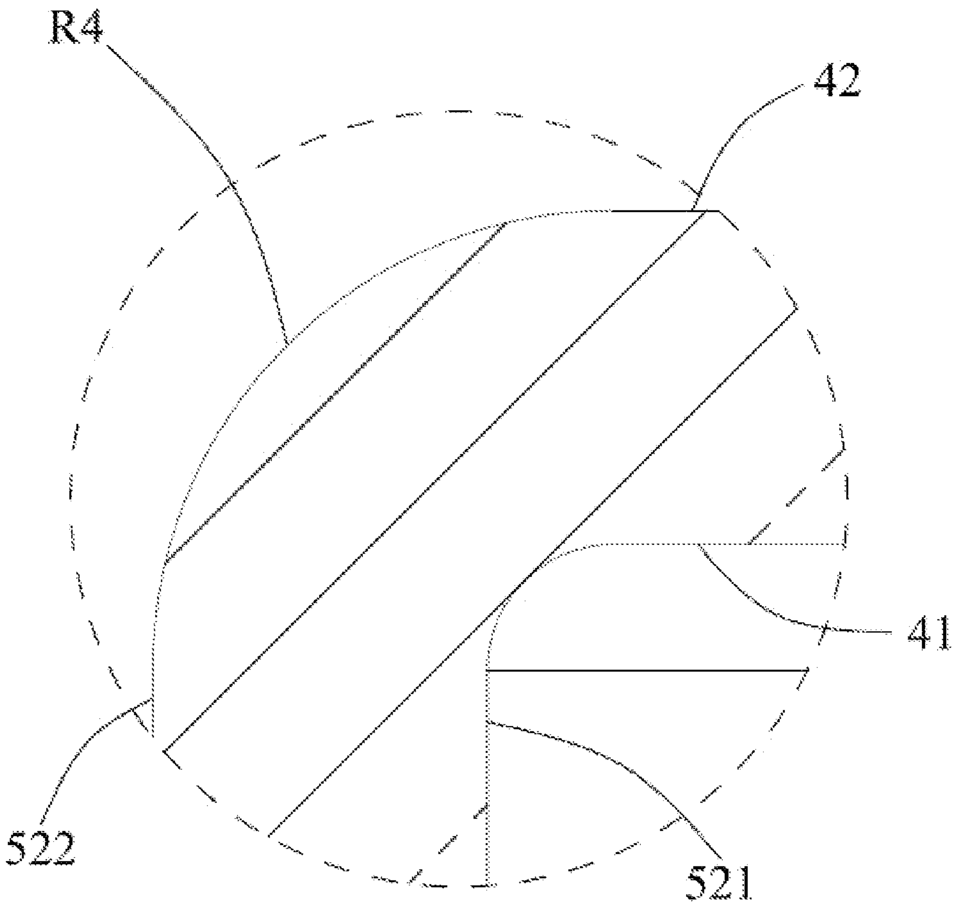
FIG. 8 is an enlarged view of part E in FIG. 4.

Referring to FIG. 4 and FIG. 8, the vertical connecting portion 52 includes a fourth inner surface 522 facing the inner cavity 10. The mounting face portion 4 includes a fifth inner surface 42 facing the inner cavity 10. There is a fourth connecting arc surface between the fourth inner surface 522 and the fifth inner surface 42. In a transverse section along the central axis 100, a fourth arc length R4 of the fourth connecting arc surface is 0.7 mm~0.9 mm.

The dimensions of R2, R3, and R4 which are respectively shown in FIG. 6, FIG. 7, and FIG. 8 are consistent with the conventional process, that is, R2, R3, and R4 use the conventional design of 0.7 mm~0.9 mm. However, the dimension of R1 shown in FIG. 6 is much smaller than the wall thickness T (0.5 mm~1 mm) of the body shaft portion 1. For example: when T is a value 0.8 mm between 0.5 mm~1 mm and the first arc length R1 is the maximum value 0.25 mm, 0.25 mm is much smaller than 0.8 mm; even when T is the minimum value of 0.5 mm~1 mm and the first arc length R1 is the maximum value of 0.25 mm, 0.25 mm is only half of 0.5 mm. The key point of the present disclosure is to reduce the first arc length R1 of the first connecting arc surface relative to the wall thickness T through the deep drawing process.

Referring to FIGS. 4 to 8, it can be understood that, the mounting face portion 4 includes a fifth outer surface 41 facing the outer cavity 50. The body shaft portion 1 includes a first inner surface 102 facing the inner cavity 10 and the inclined connecting portion 51 includes a third inner surface 512 facing the inner cavity 10. The first outer surface 101, the second outer surface 301, the third outer surface 511, the fourth outer surface 521 and the fifth outer surface 41 are all planes. The first inner surface 102, the third inner surface 512, the fourth inner surface 522 and the fifth inner surface 42 are also flat surfaces. The space between the first inner surface 102 and the third inner surface 512 is small and is directly bent to form an arc-shaped second inner surface 302 which connects the first inner surface 102 and the third inner surface 512. That is, the first outer surface 101 and the third outer surface 511 include two arc sections and a plane, but the first inner surface 102 and the third inner surface 512 include only one arc section.

Figure 9:
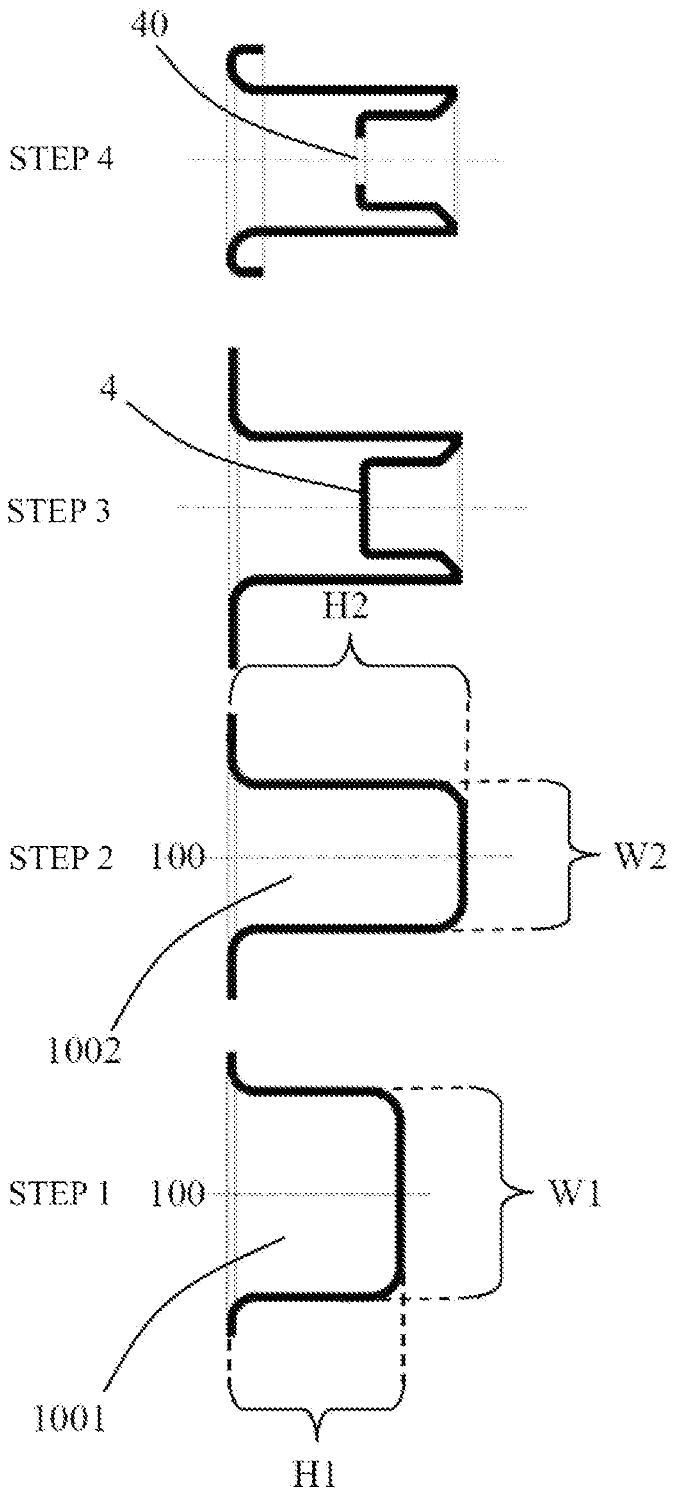
FIG. 9 is a process flow diagram of the resonator in accordance with an embodiment of the present disclosure.

The resonator of the present disclosure is made by a deep drawing process. Referring to FIG. 9, the deep drawing process includes the following steps:

Step 1: punch the flat metal plate downward for the first time to form a "prototype of the resonator" and the "prototype of the resonator" has a first inner cavity 1001, the cross section of the first inner cavity 1001 along its central axis 100 has a first width W1 and a first height H1;

Step 2: On the basis of the "prototype of the resonator", punch downward for the second time to form the "first deformation of the resonator" and the "first deformation of the resonator" has a second inner cavity 1002, the cross section of the second inner cavity 1002 along its central axis 100 has a second width W2 and a second height H2, W1>W2 and H1<H2;

Step 3: On the basis of the "first deformation of the resonator", perform the third stamping in the opposite direction upward to form the "second deformation of the resonator" and the "second deformation of the resonator" causes the resonator to form a mounting face portion 4, in the second inner cavity 1002, the mounting face portion 4 has a third height H3, H3<H2;

Step 4: On the basis of the "second deformation of the resonator", perform the fourth stamping in the opposite direction to form a "final form of the resonator" and the "final form of the resonator" refers to that, the mounting hole 40 is formed on the mounting face portion 4 and the resonator has a small rounded corner. The small rounded corner is referred to the abovementioned first connecting arc surface.

In other words, a method of manufacturing the resonator, comprises: performing a first stamping to a flat metal plate in a downward direction as forming a "prototype of the resonator", the "prototype of the resonator" having a first inner cavity, a cross section of the first inner cavity having a first width W1 and a first height H1 along its central axis; performing a second stamping to the "prototype of the resonator" in the downward direction as forming a "first deformation of the resonator", the "first deformation of the resonator" having a second inner cavity, a cross section of the second inner cavity having a second width W2 and a second height H2 along its central axis, wherein W1>W2 and H1<H2; performing a third stamping to the "first deformation of the resonator" in an upward direction, which is opposite to the downward direction, as forming a "second deformation of the resonator", the "second deformation of the resonator" causing the resonator to form a mounting face portion in the second inner cavity, the mounting face portion having a third height H3, wherein H3<H2; and performing a fourth stamping to the "second deformation of the resonator" in the upward direction as forming a "final form of the resonator", the "final form of the resonator" refers to that, a small rounded corner with a first arc length R1 is formed on the resonator and a mounting hole is formed on the mounting face portion.

The resonator of the present disclosure is based on the wall thickness T of the body shaft portion 1 being 0.5 mm~1 mm, and the first arc length R1 of the first connecting arc surface is designed to be no more than 0.25 mm through the deep drawing process shown in FIG. 9. Therefore, the coupling area of the resonator remains unchanged in the corresponding filter cavity, the overall elasticity of the resonator becomes larger, and the coupling effect will be better in terms of product indicators. The resonator of the present disclosure is based on the conventional design and the further improved small rounded design of the coupling surface, achieving the beneficial effects of smaller R1 value and larger Q value (Q factor, quality factor). The manufacturing method of the resonator disclosed in the present disclosure is relatively simple and is completed continuously through a set of deep-drawing molds without additional processes.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the present disclosure, and all technical solutions and improvements that do not depart from the spirit and scope of the present disclosure should be covered by the claims of the present disclosure.

What is claimed is:

1. A resonator, comprising:

a body shaft portion, having a top end and a bottom end which are oppositely arranged in a vertical direction, an inner cavity being slotted between the top end and the bottom end;

a resonant disk portion, being integrally formed on the top end of the body shaft portion; and a coupling face portion, being integrally formed on the bottom end of the body shaft portion;

wherein the body shaft portion comprises a first outer surface being away from the inner cavity in a first direction; the coupling face portion comprises a second outer surface being away from the inner cavity in a second direction perpendicular to the first direction; a first connecting arc surface is formed between the first outer surface and the second outer surface; the inner cavity has a central axis extending in the vertical direction; and wherein in a transverse section perpendicular to the central axis, a wall thickness T of the body shaft portion is 0.5 mm~1 mm and a first arc length R1 of the first connecting arc surface is no more than 0.25 mm.

2. The resonator according to claim 1, further comprising a mounting face portion received in the inner cavity, and a connecting portion connected between the coupling face portion and the mounting face portion; wherein the mounting face portion and the coupling face portion extend in two planes arranged up and down, and the two planes are perpendicular to the central axis and parallel to each other, the mounting face portion and the coupling face portion are connected with each other through the connecting portion.

3. The resonator according to claim 2, wherein the mounting face portion defines a mounting hole and a center of the mounting hole is located on the central axis.

4. The resonator according to claim 3, wherein the connecting portion comprises an inclined connecting portion connected to the coupling face portion.

5. The resonator according to claim 4, wherein the connecting portion comprises a vertical connecting portion connected to the mounting face portion.

6. The resonator according to claim 5, wherein an outer cavity is surrounded by the mounting face portion, the inclined connecting portion, and the vertical connecting portion; and wherein the inner cavity and the outer cavity are separated to each other by the mounting face portion, the inclined connecting portion, the vertical connecting portion and connected to each other through the mounting hole.

7. The resonator according to claim 6, wherein the inclined connecting portion comprises a third outer surface facing the outer cavity, and a second connecting arc surface is formed between the second outer surface and the third outer surface; and wherein in the transverse section along the central axis, a second arc length R2 of the second connecting arc surface is 0.7 mm~0.9 mm.

8. The resonator according to claim 7, wherein the vertical connecting portion comprises a fourth outer surface facing the outer cavity, and a third connecting arc surface is formed between the third outer surface and the fourth outer surface; and wherein in the transverse section along the central axis, a third arc length R3 of the third connecting arc surface is 0.7 mm~0.9 mm.

9. The resonator according to claim 6, wherein the vertical connecting portion comprises a fourth inner surface facing the inner cavity, the mounting face portion comprises a fifth inner surface facing the inner cavity, and a fourth connecting arc surface is formed between the fourth inner surface and the fifth inner surface; and wherein in the transverse section along the central axis, a fourth arc length R4 of the fourth connecting arc surface is 0.7 mm~0.9 mm.

10. A resonator, comprising:

a body shaft portion, defining an inner cavity extending in a vertical direction, the body shaft portion having both a top end and a bottom end oppositely arranged at the inner cavity;

a resonant disk portion, being integrally formed on the top end of the body shaft portion; and a coupling face portion, being integrally formed on the bottom end of the body shaft portion;

wherein the body shaft portion comprises a first outer surface being away from the inner cavity in a first direction and the coupling face portion comprises a second outer surface being away from the inner cavity in a second direction perpendicular to the first direction, a first connecting arc surface is formed between the first outer surface and the second outer surface, the inner cavity defines a central axis and a transverse section which is perpendicular to the central axis; and wherein in the transverse section, a wall thickness T of the body shaft portion is 0.5 mm~1 mm and a first arc length R1 of the first connecting arc surface is no more than 0.25 mm.

11. The resonator according to claim 10, further comprising a mounting face portion received in the inner cavity; wherein the mounting face portion and the coupling face portion extend in two up-and-down arranged planes, and the two up-and-down arranged planes are perpendicular to the central axis and parallel to each other.

12. The resonator according to claim 11, wherein the mounting face portion defines a mounting hole and a center of the mounting hole is located on the central axis to ensure installation accuracy of the resonator in a filter product.

13. The resonator according to claim 12, further comprising a connecting portion between the coupling face portion and the mounting face portion; wherein the connecting portion comprises an inclined connecting portion connected to the coupling face portion and a vertical connecting portion connected to the mounting face portion.

14. The resonator according to claim 13, wherein an outer cavity is separated from the inner cavity by the mounting face portion, the inclined connecting portion, and the vertical connecting portion, and wherein the inner cavity is communicated to the outer cavity through the mounting hole.

15. The resonator according to claim 14, wherein the inclined connecting portion comprises a third outer surface facing the outer cavity, and a second connecting arc surface is formed between the second outer surface and the third outer surface; and wherein in the transverse section along the central axis, a second arc length R2 of the second connecting arc surface is 0.7 mm~0.9 mm.

16. The resonator according to claim 15, wherein the vertical connecting portion comprises a fourth outer surface facing the outer cavity, and a third connecting arc surface is formed between the third outer surface and the fourth outer surface; and wherein in the transverse section along the central axis, a third arc length R3 of the third connecting arc surface is 0.7 mm~0.9 mm.

17. The resonator according to claim 14, wherein the vertical connecting portion comprises a fourth inner surface facing the inner cavity, the mounting face portion comprises a fifth inner surface facing the inner cavity, and a fourth connecting arc surface is formed between the fourth inner surface and the fifth inner surface; and wherein in the transverse section along the central axis, a fourth arc length R4 of the fourth connecting arc surface is 0.7 mm~0.9 mm.

* * * * *